March 31, 1953   A. J. ROSENBERGER ET AL   2,633,022
LIQUID LEVEL MEASURING APPARATUS
Filed May 7, 1949
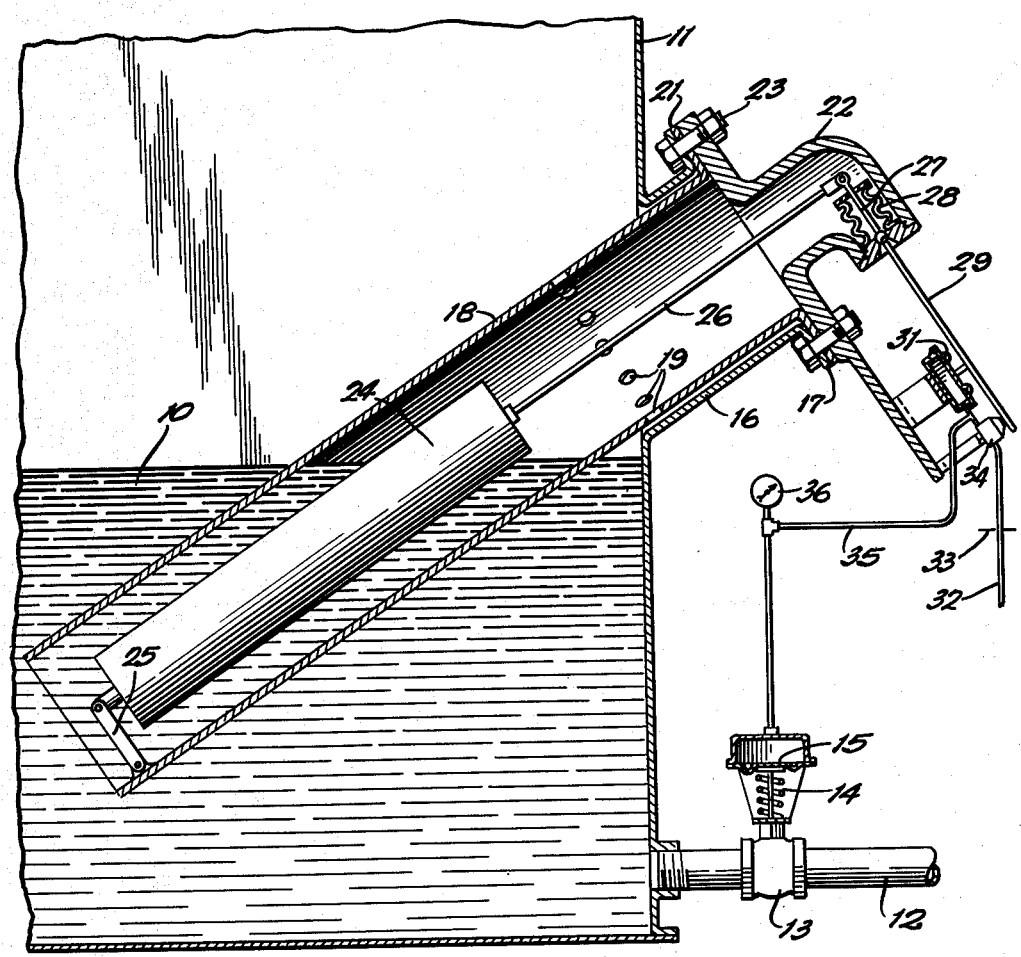
INVENTORS:
Albert J. Rosenberger
and George E. Lindemann,
BY Davern, Orme, Birth and Spangenberg,
ATTORNEYS.

Patented Mar. 31, 1953

2,633,022

UNITED STATES PATENT OFFICE 2,633,022

LIQUID LEVEL MEASURING APPARATUS

Albert J. Rosenberger and George E. Lindemann, Chicago, Ill., assignors to Republic Flow Meters Co., Chicago, Ill., a corporation of Illinois Application May 7, 1949, Serial No. 91,998

7 Claims. (Cl. 73—309)

This invention relates to liquid level measuring apparatus and particularly to apparatus for measuring the liquid level in relatively large tanks, columns, or the like.

In many types of apparatus such as distillation columns and the like, it is impossible to insert a float from the top of the column to measure the liquid level in a pool at an intermediate point or at the bottom of the column. At the same time it is highly desirable to indicate or control the liquid level in such pools without removing the liquid from the column as into a sight glass or the like.

The present invention has for one of its objects the provision of apparatus which can be mounted in the side of a tank or column to measure the liquid level in an adjacent pool.

Another object of the invention is to provide liquid measuring apparatus in which the measuring element is an elongated displacer lying at an angle to the vertical and movable parallel to its length. The displacer is preferably supported by parallel levers pivoted to the displacer at spaced points in its length.

Still another object is to provide liquid level indicating apparatus in which the force exerted by the displacer is opposed by a motor which is controlled by unbalance between the displacer and the motor. In the preferred construction a fluid motor is employed controlled by a nozzle which is variably restricted by movement of one of the displacer supporting levers.

A further object is to provide liquid level measuring apparatus which can be inserted and removed as a unit through a nipple at any desired point in the side of a tank or column without disturbing the remainder of the tank or column.

The above and other objects and advantages of the invention will be more readily apparent when read in connection with the accompanying drawing, in which—

The single figure is a diagrammatic sectional view of a liquid level indicating apparatus embodying the invention.

As shown, the apparatus of the invention is arranged to measure the level of liquid in a pool 10 in the lower part of a distillation tower 11. In this type of device liquid normally tends to accumulate in the pool 10 and is drawn off through a pipe 12 under the control of a valve 13 to prevent excessive accumulation of liquid, although it is desired at all times to maintain some liquid in the pool. The valve 13 is urged closed by a spring 14 and will be more or less opened by pressure applied to a diaphragm 15. It will be understood that this particular type of installation and valve control are illustrative only and that the measuring device of the invention could be used without a valve control and in installations in which liquid must be added.

The column 11 is formed with a nipple 16 projecting from the side thereof at a point slightly above the maximum expected level of liquid in the pool 10, and the nipple, as shown, terminates in an outwardly turned flange 17 for mounting the measuring apparatus of the invention. It will be understood that such nipples can be placed at any desired point or points in a tank or column adjacent to which a liquid level is to be measured. The measuring apparatus of the invention is inserted through the nipple 16 and is mounted thereby on the tank or column in a position at an acute angle to the vertical. The apparatus, as shown, comprises a tube 18 which may be open at the bottom and which is preferably formed with one or more openings 19 near its upper end to establish communication with the interior of the column. The tube is preferably employed both as a support for the displacer element and to prevent surges of liquid from vibrating or agitating the displacer, and while a tube is preferable in many respects, any type of elongated support could be employed equally well. The tube is flanged at its outer end as indicated at 21 to register with the flange 17, and the outer end of the tube is closed by a hollow head 22 similarly flanged. For mounting and sealing the parts in the column or tank, the several flanges may be secured together by bolts 23 to provide a rigid mechanical support as well as a fluid tight seal.

An elongated displacer 24 is mounted in the tube for axial movement therein and is adapted to extend partially into the liquid pool 10, as shown. The displacer may be heavier or lighter than the liquid, as desired, and in either case will exert a varying buoyancy as the liquid level varies and which is a measure of the liquid level. In the form of instrument shown, the displacer is lighter than the liquid and functions as a float, although for a heavier displacer the control parts to be described hereinafter could be reversed as will be apparent.

To guide the displacer for movement, it is pivotally connected at one end to a link 25 which is, in turn, pivoted to the lower end of the tube 18 and which preferably lies at substantially a right angle to the tube axis and the displacer. At its opposite end the displacer carries an elongated extension rod 26 which is pivoted at its end to a lever section 27 which lies parallel to the link 25 and is pivoted to an extension on the head 22. To prevent the escape of fluid around the lever section 27, a flexible bellows 28 which may be of the type more particularly described and claimed in the patent to Rosenberger, No. 2,299,179, is connected to the lever 27 and to the head 22. With this construction the lever is permitted to move about its pivot and escape of fluid around the lever is effectively prevented.

The longitudinal force exerted by the displacer is balanced according to the invention by a motor mechanism so that the displacer is maintained in substantially the same position at all times, and the force exerted by it is a measure of the depth of liquid in the pool 10. As shown, the lever 27 has an extension 29 which forms with the lever a balance beam and which extends outward therefrom beyond the head 22. Longitudinal upward force on the displacer will tend to rock the beam clockwise, and this force is balanced by a fluid motor shown as a diaphragm 31 connected to the extension 29 and tending to rock it counterclockwise. Fluid such as air under pressure is supplied to the motor through a supply conduit 32 having a restriction 33 therein which is connected both to the diaphragm and to a bleed nozzle 34 adjacent the end of the extension 29 to be variably restricted thereby. A connection is preferably also made from the motor through a pipe 35 to an indicator 36 which may be calibrated in terms of liquid level and to the valve diaphragm 15.

When the parts are in balance, the pressure produced back of the nozzle 34 will be just sufficient when acting on the diaphragm 31 to balance the force exerted by the displacer. This pressure, as indicated by the meter 36 indicates the liquid level in the pool and will hold the valve 13 open to the proper extent to maintain the liquid at the proper level. Should the supply of liquid to the pool from the tower interior change, for example, to produce an increase in the liquid level, the displacer will exert a greater upward force and will tend to rock the beam 29 clockwise to restrict the nozzle 34. This will cause an increase in pressure back of the nozzle so that the diaphragm 31 will exert a greater force to balance the displacer and at the same time will act on the diaphragm 15 to open the valve 13 further. Opening of the valve will tend to reduce the liquid level until it is brought back to the desired point, all changes in the level being indicated at the meter 36. Thus with the construction shown the liquid level in the pool is accurately measured at all times and is utilized to operate an indicator and to control a valve affecting the lever.

While one embodiment of the invention has been shown and described in detail herein, it will be understood that this is illustrative only and is not to be taken as a definition of the scope of the invention, reference being had for this purpose to the appended claims.

What is claimed is:

1. Liquid level measuring apparatus comprising an elongated liquid displacer, a pair of parallel levers connected to the displacer at spaced points in its length to guide it for lengthwise movement, means supporting the levers and displacer at an acute angle to the vertical in a position to be partially submerged in liquids, balancing means connected to the displacer to balance the longitudinal force thereon and to hold the displacer against longitudinal movement, and indicating means responsive to the force exerted by the balancing means.

2. Liquid level measuring apparatus comprising an elongated liquid displacer, a pair of parallel levers connected to the displacer at spaced points in its length to guide it for lengthwise movement, means supporting the levers and displacer at an acute angle to the vertical in a position to be partially submerged in liquids, power means connected to the displacer to balance the longitudinal force exerted thereby, and control means for the power means responsive to movement of one of the levers.

3. Liquid level measuring apparatus comprising an elongated liquid displacer, a pair of parallel levers connected to the displacer at spaced points in its length to guide it for lengthwise movement, means supporting the levers and displacer at an acute angle to the vertical in a position to be partially submerged in liquids, a fluid motor connected to the displacer to balance the longitudinal force exerted by the displacer, and a control valve for the motor responsive to movement of one of the levers.

4. Liquid level measuring apparatus comprising an elongated liquid displacer, a pair of parallel levers connected to the displacer at spaced points in its length to guide it for lengthwise movement, means supporting the levers and displacer at an acute angle to the vertical in a position to be partially submerged in liquids, one of the levers being extended to form a balance beam, a fluid motor connected to the balance beam to balance the force exerted thereon by the displacer, and a fluid nozzle connected to the motor and mounted adjacent the balance beam to be variably restricted thereby to control the motor.

5. Liquid level measuring apparatus comprising a tube adapted to be mounted in a liquid containing tank at an acute angle to the vertical, an elongated displacer mounted therein, means mounting the displacer for axial movement only a motor carried by the tube and connected to the displacer to balance the axial force exerted by the displacer, and control means for the motor responsive to axial movement of the displacer.

6. Liquid level measuring apparatus comprising a tube adapted to be mounted in a liquid containing tank at an acute angle to the vertical, an elongated displacer mounted in the tube for axial movement therein, parallel levers pivotally connected at one end to the tube and at their other ends to the displacer to guide it for axial movement in the tube, a motor carried by the tube and connected to the displacer to balance the axial force exerted thereby, and control means for the motor responsive to movement of one of the levers.

7. Liquid level measuring apparatus comprising a tube adapted to be mounted in a liquid containing tank at an acute angle to the vertical, an elongated displacer mounted in the tube for axial movement therein, a head closing one end of the tube, a pair of parallel levers pivoted at one end to the displacer and at their other ends to the tube and the head respectively, an extension on one of the levers projecting through the head to form a balance beam, means sealing the balance beam in the head to prevent leakage of fluid around the balance beam, a motor acting on the balance beam outside of the head, and control means for the motor responsive to movement of the balance beam.

ALBERT J. ROSENBERGER.
GEORGE E. LINDEMANN.

REFERENCES CITED

The following references are of record in the file of this patent:

UNITED STATES PATENTS

| Number | Name | Date |
|---|---|---|
| 2,248,322 | Annin | July 8, 1941 |
| 2,342,696 | Rover | Feb. 29, 1944 |
| 2,459,542 | Rosenberger | Jan. 18, 1949 |

FOREIGN PATENTS

| Number | Country | Date |
|---|---|---|
| 853,015 | France | Nov. 18, 1939 |